E. MAYNARD.

Cartridge.

No. { 87, / 1,192. }

Reissued May 28, 1861.

F. PETERS, PHOTO-LITHOGRAPHER, WASHINGTON, D. C.

UNITED STATES PATENT OFFICE.

EDWARD MAYNARD, OF WASHINGTON, DISTRICT OF COLUMBIA.

IMPROVEMENT IN METALLIC CARTRIDGE-CASES.

Specification forming part of Letters Patent No. 22,565, dated January 11, 1859; Reissue No. 1,192, dated May 28, 1861.

*To all whom it may concern:*

Be it known that I, EDWARD MAYNARD, of the city of Washington and District of Columbia, have invented a new and Improved Metallic Cartridge; and I do hereby declare that the following is a full and exact description thereof, reference being had to the accompanying drawings, which form a portion of this specification—

Figure 1:
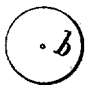
Figure 3:
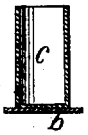
Figure 2:
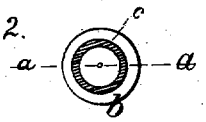

Figure 1 being a bottom view of said cartridge; Fig. 2, a top view of the same, and Fig. 3 a section in the line *a a* of Fig. 2.

The essential novelty in my improved metallic cartridge consists in its being composed of two permanently-united parts—viz., a cup, *c*, and a disk, *b*, the latter being united directly to the bottom of the former, and being of such a diameter as to form a flange around the bottom of the cartridge, for the purpose of facilitating the handling of the same in loading and unloading breech-loading fire-arms.

The cup portion *c* of my improved metallic cartridge is formed of a single piece of elastic metal, and by any suitable method. The exterior portion *b* of the bottom of said cartridge may be cut from a sheet of any suitable quality and thickness of metal, and may be united to the bottom of the cup portion of the cartridge by means of any suitable solder, or by any other method of forming a permanent connection between metallic surfaces that may be known to manufacturers of articles of this character. After thus forming my said improved metallic cartridge, a small vent is formed in the double bottom of the same for the entrance of the priming-fire.

What I claim as my invention, and desire to secure by Letters Patent, is—

A double-bottomed cartridge composed of an elastic metal cup and an exterior metallic disk, the said cup and disk being permanently united with each other by soldering or some other similar process, substantially in the manner herein set forth.

The above specification of my improved metallic cartridge signed and witnessed this 23d day of February, 1861.

EDWARD MAYNARD.

Witnesses:

SAML. DRURY,

GEO. C. DE MARINI.